United States Patent
Keaton et al.

(10) Patent No.: US 8,422,119 B1
(45) Date of Patent: Apr. 16, 2013

(54) COMPENSATION OF BEAM WALKOFF IN NONLINEAR CRYSTAL USING CYLINDRICAL LENS

(75) Inventors: Gregory L. Keaton, San Francisco, CA (US); Manuel J. Leonardo, San Francisco, CA (US); Mark A. Arbore, Los Altos, CA (US)

(73) Assignee: Disco Corporation, Tokyo (JP)

( * ) Notice: Subject to any disclaimer, the term of this patent is extended or adjusted under 35 U.S.C. 154(b) by 409 days.

(21) Appl. No.: 12/886,445

(22) Filed: Sep. 20, 2010

(51) Int. Cl.
*G02F 1/35* (2006.01)
*H01S 3/10* (2006.01)

(52) U.S. Cl.
USPC ............. 359/326; 359/328; 359/330; 372/21; 372/101

(58) Field of Classification Search .................... 359/326
See application file for complete search history.

(56) References Cited

U.S. PATENT DOCUMENTS

| | | | |
|---|---|---|---|
| 7,113,325 B1 * | 9/2006 | Moulton et al. | 359/326 |
| 2010/0074296 A1 * | 3/2010 | Iwashiro et al. | 372/99 |
| 2011/0243163 A1 * | 10/2011 | Peng et al. | 372/22 |

* cited by examiner

*Primary Examiner* — Hemang Sanghavi
(74) *Attorney, Agent, or Firm* — Joshua D. Isenberg; JDI Patnt (57) ABSTRACT

A nonlinear optical system may include optics, a non-linear optical crystal, and a uni-axial focusing element. The non-linear optical crystal is configured to generate an output beam from a non-linear optical interaction with an input beam. The optics are configured to image the input beam to an original input beam waist within the non-linear optical crystal, whereby the output beam has an original output beam waist. The uni-axial focusing element is optically coupled to the non-linear optical crystal. The uni-axial focusing element is configured so that the output beam has a new output beam waist at approximately the same location as the original output beam waist.

22 Claims, 6 Drawing Sheets

COMPENSATION OF BEAM WALKOFF IN NONLINEAR CRYSTAL USING CYLINDRICAL LENS

FIELD OF THE INVENTION

This invention is related nonlinear optics and more particularly to a harmonic generator system that produces a rounded output beam.

BACKGROUND OF THE INVENTION

Wavelength-converted laser systems often use nonlinear optical crystals, such as lithium borate (LBO) to generate a visible wavelength output beam from an infrared input beam generated by a source laser. In second harmonic generation (SHG), for example, a non-linear process taking place in the crystal combines two photons of infrared input radiation to produce a photon of visible output radiation having twice the frequency of the input infrared radiation. In third harmonic generation (THG), second harmonic generation is combined with an additional nonlinear optical crystal that is phase matched to combine a photon of the SHG output with a photon of the infrared input to produce third harmonic generation (THG) output having three times the frequency of the infrared input radiation.

Nonlinear crystals such as LBO are often characterized by an anisotropic refractive index, and this has an effect on the shape of the wavelength-converted output beam. An anisotropic refractive index means that the index of refraction depends on the direction of propagation and polarization of radiation in the crystal. If an unpolarized beam is launched into such a crystal, it will typically exhibit double refraction: the beam will split into two polarized beams that are not collinear but whose directions of propagation differ by an angle called the walk-off angle.

When a crystal with an anisotropic refractive index such as LBO is used for second harmonic generation, there will be walk-off among the beams. Either the output beam travels at a walk-off angle with respect to the input beam, or else the input beam itself undergoes double refraction, breaking up into two beams, one of which propagates at the walk-off angle. Because of the walk-off, the output beam is distorted and ends up with a different shape than the input beam. Typically the input beam is circular, and the output beam is elliptical.

The problem of beam shape distortion is further compounded in third harmonic generation. Three beams propagate in the THG crystal: the input fundamental beam, the second harmonic beam, and the third harmonic output beam. One of the beams travels at a walk-off angle with respect to the other two, and this walk-off distorts the THG output beam. Because the second harmonic beam is typically noncircular already, the third harmonic beam is generally even more noncircular than the second harmonic beam.

However, in many practical applications that use nonlinear optical wavelength conversion it is desirable for the output beam to have a circular cross-section. One solution is to use two cylindrical lenses to image the wavelength-converted output beam to the desired location and shape. Unfortunately, an optical relay using two cylindrical lenses is extremely sensitive to slight rotations of the lenses. Rotational misalignments on the order of milli-radians can introduce severe aberrations into the beam. Furthermore, if the output beam is ultra-violet, it is often undesirable to use any beam-shaping optics at all, since ultra-violet light quickly degrades most bulk materials and coatings that are put in its path.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the embodiments of the invention described below are set forth without any loss of generality to, and without imposing limitations upon, the claimed invention.

GLOSSARY

As used herein:

Beam splitter refers to an optical device capable of splitting a beam of light into two or more parts.

Cavity or Optically Resonant Cavity refers to an optical path defined by two or more reflecting surfaces along which light can reciprocate or circulate. Objects that intersect the optical path are said to be within the cavity.

Continuous wave (CW) laser refers to a laser that emits radiation continuously rather than in short bursts, as in a pulsed laser.

Diode Laser refers to a light-emitting diode designed to use stimulated emission to generate a coherent light output. Diode lasers are also known as laser diodes or semiconductor lasers.

Diode-Pumped Laser refers to a laser having a gain medium that is pumped by a diode laser.

Gain refers to an increase in intensity, power, or pulse energy of a signal that is transmitted from one point to another through an amplifier. The term "unsaturated gain" refers to the increase of a small signal passing through the amplifier, which does not significantly change the inversion level in the amplifier. As used herein gain and unsaturated gain will be used interchangeably.

Gain Medium refers to a material capable of generating optical gain as described below with respect to a Laser.

Garnet refers to a particular class of oxide crystals, including e.g., yttrium aluminum garnet (YAG), gadolinium gallium garnet (GGG), gadolinium scandium gallium garnet (GSGG), yttrium scandium gallium garnet (YSGG) and similar.

Infrared Radiation refers to electromagnetic radiation characterized by a vacuum wavelength between about 700 nanometers (nm) and about 100,000 nm.

Laser is an acronym of light amplification by stimulated emission of radiation. A laser is a cavity that is contains a lasable material. This is any material—crystal, glass, liquid, semiconductor, dye or gas—the atoms of which are capable of being excited to a metastable state by pumping e.g., by light or an electric discharge. Light is emitted from the metastable state by the material as it drops back to the ground state. The light emission is stimulated by the presence by a passing photon, which causes the emitted photon to have the same phase and direction as the stimulating photon. The light (referred to herein as stimulated radiation) oscillates within the cavity, with a fraction ejected from the cavity to form an output beam.

Light: As used herein, the term "light" generally refers to electromagnetic radiation in a range of frequencies running from infrared through the ultraviolet, roughly corresponding to a range of vacuum wavelengths from about 1 nanometer ($10^{-9}$ meters) to about 100 microns.

Non-linear effect refers to a class of optical phenomena that can typically be viewed only with nearly monochromatic, directional beams of light, such as those produced by a laser. Higher harmonic generation (e.g., second-, third-, and fourth-harmonic generation), optical parametric oscillation, sum-frequency generation, difference-frequency generation, optical parametric amplification, and the stimulated Raman Effect are examples of non-linear effects.

Nonlinear Optical Wavelength Conversion Processes are non-linear optical processes whereby input light of a given vacuum wavelength passing through a non-linear medium interacts with the medium and/or other light passing through the medium in a way that produces output light having a different vacuum wavelength than the input light. Nonlinear wavelength conversion is equivalent to nonlinear frequency conversion, since the two values are related by the vacuum speed of light. Both terms may be used interchangeably. Nonlinear Optical Wavelength conversion includes:

Higher Harmonic Generation (HHG), e.g., second harmonic generation (SHG), third harmonic generation (THG), fourth harmonic generation (FHG), etc., wherein two or more photons of input light interact in a way that produces an output light photon having a frequency $Nf_0$, where N is the number of photons that interact. For example, in SHG, N=2.

Sum Frequency Generation (SFG), wherein an input light photon of frequency $f_1$ interacts with another input light photon of frequency $f_2$ in a way that produces an output light photon having a frequency $f_1+f_2$.

Difference Frequency Generation (DFG), wherein an input light photon of frequency $f_1$ interacts with another input light photon of frequency $f_2$ in a way that produces an output light photon having a frequency $f_1-f_2$.

Examples of non-linear crystals include, but are not limited to, lithium niobate ($LiNbO_3$), lithium triborate (LBO), beta-barium borate (BBO), cesium lithium borate (CLBO), lithium tantalite, stoichiometric lithium tantalite (SLT) potassium titanyl phosphate ($KTiOPO_4$ also known as KTP), ammonium dihydrogen arsenate (ADA), ammonium dihydrogen phosphate (ADP), cesium triborate ($CsB_3O_5$ or CBO), deuterated ammonium dihydrogen arsenate (DADA), deuterated ammonium dihydrogen phosphate (DADP), deuterated arginine phosphate (DLAP), rubidium di-deuterium phosphate ($RbD_2PO_4$ or DRDP, potassium aluminum borate (KABO), potassium dihydrogen arsenate (KDA), potassium dihydrogen phosphate (KDP), deuterated potassium dihydrogen phosphate ($KD_2PO_4$ or DKDP), $L_i2B_4O_7$ (LB4), or lithium formate monohydrate (LFM) and isomorphs thereof, periodically poled materials such as periodically poled lithium niobate (PPLN), periodically poled lithium tantalite (PPSLT), and the like.

Optical fiber can also be induced to have a non-linear response to optical radiation by fabricating microstructures in the fiber.

Optical amplifier refers to an apparatus that amplifies the power of an input optical signal. An optical amplifier is similar to a laser in that it uses a gain medium driven by pumping radiation. The amplifier generally lacks feedback (i.e. a cavity), so that it has gain but does not oscillate. As used herein an optical power amplifier generally refers to the last optical amplifier before delivery of an amplified beam to a target or a wavelength converter. An amplifier stage between a source of radiation and a power amplifier is generally referred to herein as a preamplifier.

Phase-matching refers to the technique used in a multiwave nonlinear optical process to enhance the distance over which the coherent transfer of energy between the waves is possible. For example, a three-wave process is said to be phase-matched when $k_1+k_2=k_3$, where $k_i$ is the wave vector of the $i^{th}$ wave participating in the process. In frequency doubling, e.g., the process is most efficient when the fundamental and the second harmonic phase velocities are matched. Typically the phase-matching condition is achieved by careful selection of the optical wavelength, polarization state, and propagation direction in the non-linear material.

Pulse Energy refers to the amount of energy in a pulse. Pulse energy may be calculated by integrating instantaneous pulse power over the pulse period.

Pulse Period (T) refers to the time between equivalent points of successive pulses in a train of two or more pulses.

Pulse Repetition Frequency (PRF) refers to the rate of repetition of pulses per unit time. The PRF is inversely related to the period T, e.g., PRF=1/T.

Q refers to the figure of merit of a resonator (cavity), defined as $(2\pi)\times$(average energy stored in the resonator)/(energy dissipated per cycle). The higher the reflectivity of the surfaces of an optical resonator and the lower the absorption losses, the higher the Q and the less energy loss from the desired mode.

Q-switch refers to a device used to rapidly change the Q of an optical resonator.

Q-switched Laser refers to a laser that uses a Q-switch in the laser cavity to prevent lasing action until a high level of inversion (optical gain and energy storage) is achieved in the lasing medium. When the switch rapidly increases the Q of the cavity, e.g., with acousto-optic or electro-optic modulators or saturable absorbers, a giant pulse is generated.

Quasi-CW refers to generating a succession of pulses at a high enough repetition rate to appear continuous.

Quasi Phase-matched (QPM) Material: In a quasi-phase-matched material, the fundamental and higher harmonic radiation are phase-matched by periodically changing the sign of the material's non-linear coefficient. The period of the sign change ($k_{QPM}$) adds an additional term to the phase matching equation such that $k_{QPM}+k_1+k_2=k_3$. In a QPM material, the fundamental and higher harmonic can have identical polarizations, often improving efficiency. Examples of quasi-phase-matched materials include periodically-poled lithium tantalate (PPLT), periodically-poled lithium niobate (PPLN), periodically poled stoichiometric lithium tantalate (PPSLT), periodically poled potassium titanyl phosphate (PPKTP) or periodically poled microstructured glass fiber.

Ultraviolet (UV) Radiation refers to electromagnetic radiation characterized by a vacuum wavelength shorter than that of the visible region, but longer than that of soft X-rays. Ultraviolet radiation may be subdivided into the following wavelength ranges: near UV, from about 380 nm to about 200 nm; far or vacuum UV (FUV or VUV), from about 200 nm to about 10 nm; and extreme UV (EUV or XUV), from about 1 nm to about 31 nm.

Uni-axial focusing element: an optical element, such as a lens or mirror that has a symmetry axis. The uni-axial focusing element changes the divergence of a light beam along an axis perpendicular to the symmetry axis, making the beam either more convergent or more divergent. The uni-axial focusing element does not, however, change the divergence of a light beam along an axis parallel to the symmetry axis. Common examples are uni-axial focusing elements are concave and convex cylindrical lenses, and cylindrical mirrors.

Vacuum Wavelength: The wavelength of electromagnetic radiation is generally a function of the medium in which the wave travels. The vacuum wavelength is the wavelength electromagnetic radiation of a given frequency would have if the radiation were propagating through a vacuum and is given by the speed of light in vacuum divided by the frequency.

Waist: As usual in Gaussian optics, the waist w of a beam refers to the radius of that beam at its smallest point; i.e., at the focus. The radius of a beam is defined as the distance between the center of the beam and the point where the intensity falls to $1/e^2$ of the value at the center. When the beam is not round, one generally speaks of two waists, or waist radii, $w_x$ and $w_y$, obtained by fitting the beam to an elliptical Gaussian and extracting the $1/e^2$ distances along the major and minor axes. The diameter, or width, of a beam along a certain direction (say, along the x-axis) is twice the value of the waist: diameter=2 w.

Introduction

According to embodiments of the present invention a cylindrical lens may be used to pre-compensate for walk-off within a nonlinear crystal and (optionally) at a Brewster-cut face of the crystal. A single cylinder lens may be used to independently control beam the waist roundness and waist astigmatism.

Typically, a nonlinear crystal used for frequency conversion has an anisotropic refractive index. Such crystals are characterized by principal axes; when light polarized along one principal axis has a different refractive index from light polarized along the other two axes, the crystal is called birefringent. If all three principal axes exhibit different refractive indices, the crystal is called trirefringent.

A beam traveling through a birefringent or trirefringent crystal can typically be characterized as an ordinary ray or an extraordinary ray, depending upon its polarization. An ordinary ray follows the usual laws of ray optics, such as Snell's law. An extraordinary ray, on the other hand, deviates from Snell's law.

When an unpolarized beam is incident upon a birefringent crystal, it typically splits into two polarized beams, an ordinary beam and an extraordinary beam. The two beams have perpendicular polarizations, and the extraordinary beam travels at an angle ρ, known as the walk-off angle, with respect to the ordinary beam. The ordinary and extraordinary polarization directions are determined by the principal axes of the crystal.

In a trirefringent crystal such as LBO, it is possible for both polarizations of a propagating beam to be extraordinary. However, for the embodiments considered herein, the principal axes of the nonlinear crystal are aligned so that the two possible polarizations of the input and output beams are ordinary and extraordinary, just as for a birefringent crystal. In the case when both polarizations are extraordinary, there is still in general a walk-off angle between their respective directions of propagation, and the considerations below still apply.

Figure 1A:
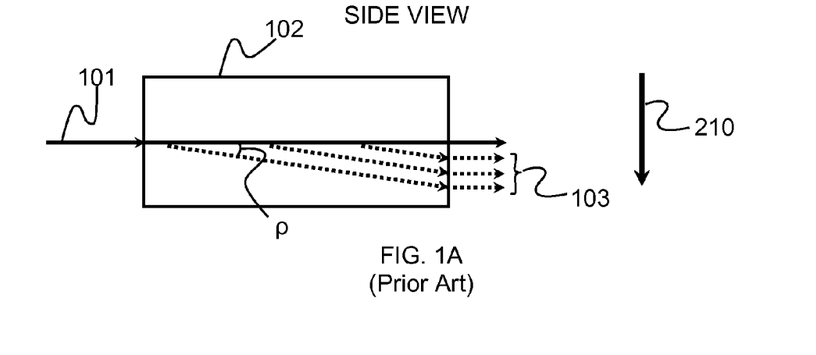
FIGS. 1A-1B are schematic diagrams illustrating the problem of walk-off during optical wavelength conversion.

FIG. 1A illustrates the problem of beam walk-off in a nonlinear optical crystal. An input beam 101 with a circular cross-section is coupled into a nonlinear optical crystal 102. In the example of FIG. 1A, nonlinear optical crystal 102 is a second harmonic generation, or SHG, crystal. Input beam 101 generates a second harmonic beam 103 in the nonlinear optical crystal. Input beam 101 is polarized along an ordinary polarization direction of the nonlinear optical crystal, and second harmonic beam 103 has an extraordinary polarization.

The second harmonic beam propagates at a walk-off angle ρ with respect to the input beam. As the second harmonic beam is generated, it walks off the input beam. Second harmonic light that is produced earlier in the crystal walks off more in a walk-off direction 210 than light that is produced later in the crystal. The result is that second harmonic beam 103 is elongated in the walk-off direction compared to input beam 101.

Figure 1B:
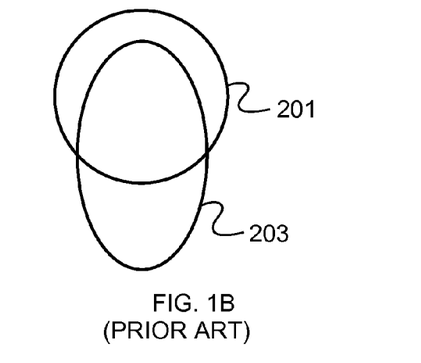

This distortion of second harmonic beam 103 is illustrated in FIG. 1B. A cross section 201 of input beam 101 is shown, together with a cross section 203 of second harmonic beam 103. Both cross sections are taken at an exit face of the nonlinear optical crystal. As FIG. 1B shows, the cross section 203 of the second harmonic beam is noncircular; it is typically elliptical, with its major axis parallel to the walk-off direction. Furthermore, the centroid of second harmonic beam cross section 203 is shifted in the walk-off direction relative to the centroid of the input beam cross-section.

The beam configuration illustrated in FIG. 1A is called the o-o-e configuration, since two input photons of ordinary polarization from the input beam combine to form one photon of extraordinary polarization in the second harmonic beam. Another possible configuration for second harmonic generation is called o-e-o. In an o-e-o configuration the input beam has both ordinary and extraordinary components, and the output beam is an ordinary beam. In this configuration also, the walk-off of the extraordinary beam distorts the output beam so that it is not circular, even though the input beam is circular.

Figure 2A:
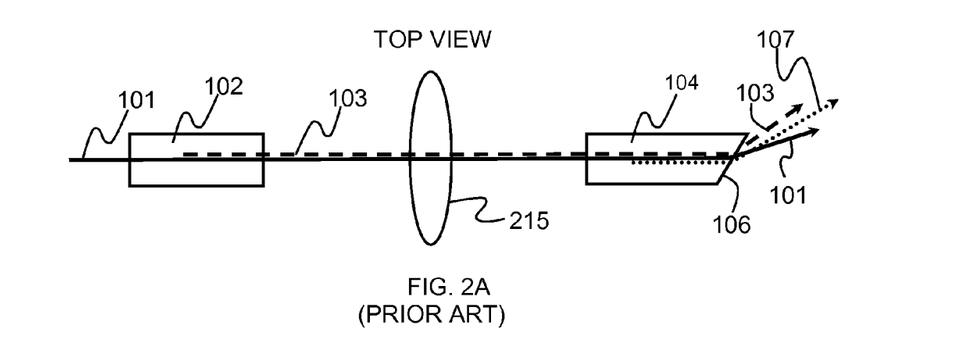
FIGS. 2A-2B are schematic diagrams of conventional optical wavelength conversion apparatuses.

The problem of beam distortion may be further compounded if the elliptical second harmonic beam 103 and the remainder of input beam 101 are coupled into a third harmonic generation (THG) crystal 104, as shown in FIG. 2A. Typically, a lens 215 is used to couple the beams into THG crystal 104. Three beams propagate in the THG crystal: input beam 101, second harmonic beam 103, and a third harmonic output beam 107. For a phase-matching condition to be met in the THG crystal—in other words, for the frequency conversion process to be efficient—one or two of the three beams in the THG crystal must be an extraordinary beam. In FIG. 2A, THG crystal 104 is in o-e-o configuration: input beam 101 has ordinary polarization, second harmonic beam 103 has extraordinary polarization, and third harmonic output beam 107 has ordinary polarization. Second harmonic beam 103 propagates at a second walk-off angle ρ' with respect to beams 101 and 107 in THG crystal 104, and this walk-off, together with the ellipticity of second harmonic beam 103, in general causes output beam 107 to be noncircular.

Another factor can further distort output beam 107: often the THG crystal 104 has an exit face 106 cut at Brewster's angle, as shown in FIG. 2A. This Brewster cut eliminates reflections of output beam 107 as the beam leaves THG crystal 104. The Brewster cut also separates output beam 107 from input beam 101 and second harmonic beam 103. Unfortunately, the Brewster cut takes output beam 107, already distorted by walk-off, and makes it even more elliptical.

For further information on nonlinear optical crystals, including nonlinear efficiencies in different orientations such as o-o-e and o-e-o, free software is available from AS-Photonics. The software is called SNLO, and can be downloaded from the website www.as-photonics.com. For mathematical details of frequency conversion in nonlinear optical crystals with walk-off, see G. D. Boyd and D. A. Kleinman, "Parametric Interaction of Focused Gaussian Light Beams," Journal of Applied Physics, Vol. 39, No. 8, July 1968, pp. 3597-3639.

In embodiments of the present invention it is desired to pre-compensate the input beam 101 (e.g., an infra-red beam) so that output beam 107 (e.g., a UV output beam from the THG crystal) is round and has no astigmatism. One way to accomplish this is to use cylindrical lenses to compress the input beam parallel to the walk-off direction 210. Another method is to expand the input beam in the non-walk-off direction (i.e., perpendicular to walk-off direction 210). One normally needs two cylindrical lenses to get the right beam size, shape, and waist location.

Unfortunately, an optical relay using two cylindrical lenses is very sensitive to slight rotational misalignments of the lenses. Small rotations of the lenses can have large effects on subsequent beam propagation, making the alignment of these lenses difficult and time consuming. Furthermore, a relay using two cylindrical lenses will typically not be compact enough for many applications.

Another possible way to pre-compensate for walk-off in nonlinear crystal 102 is to use an angle cut on an input face of the nonlinear crystal. The input face could be cut at an angle in the same plane as the walk-off direction, thereby making nonlinear crystal 102 behave like a prism and reshape the input beam accordingly. Although this would work in theory it is less practical than using a lens since an angle cut on a crystal face cannot be adjusted as easily as the position of a lens.

To pre-compensate for the effects of walk-off and of a Brewster-cut end face on the shape of the output beam, it is desirable to use a single cylindrical lens to create a suitably elliptical image of the input beam waist. A design using only one cylindrical lens would be more compact, use fewer components, and be easier to align than a two-cylindrical lens approach.

When a single cylindrical lens is used for pre-compensation, typically as the apparatus is being built, the input beam is first focused to a circular waist within the nonlinear crystal 102. Then the cylindrical lens is introduced before the nonlinear crystal to make the waist of the input beam elliptical. The original circular waist of the input beam acts as a virtual object for the cylindrical lens, and the cylindrical lens produces a real image. The real image is elliptical, and exists at approximately the same location as the virtual, circular object. Typically, the virtual object and the real image are both located within the nonlinear crystal approximately halfway along the length of the crystal.

A single cylindrical lens can also be used advantageously after the nonlinear crystal or crystals, for post-compensation of walk-off effects. In this case the cylindrical lens has a real object—the elliptical waist of the output beam—and produces a circular, virtual image at the same location as the object, so that the final output beam is round.

1. Cylindrical Lens to Compensate for Walk-Off

Figure 2B:
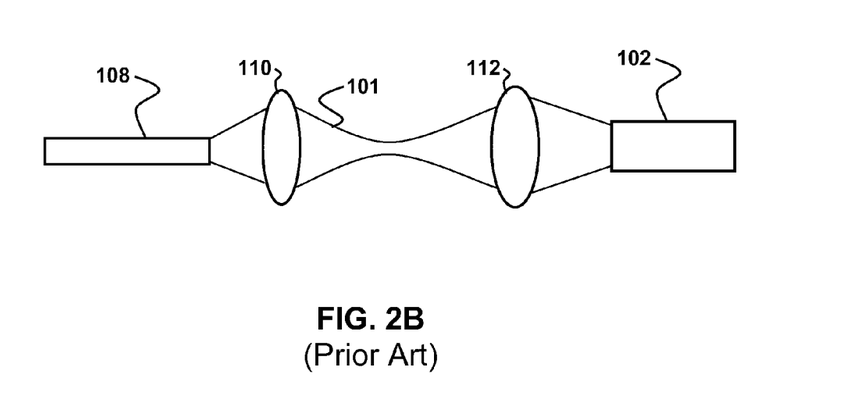

FIG. 2B shows a typical design of an optical system that can be used to couple the input light to the non-linear optical crystal. Specifically, in the system shown in FIG. 2B, the input light 101 (e.g., infrared light) is coupled from the end of an optical fiber 108 into non-linear optical crystal 102 via first and second spherical relay lenses 110, 112.

Figure 3:
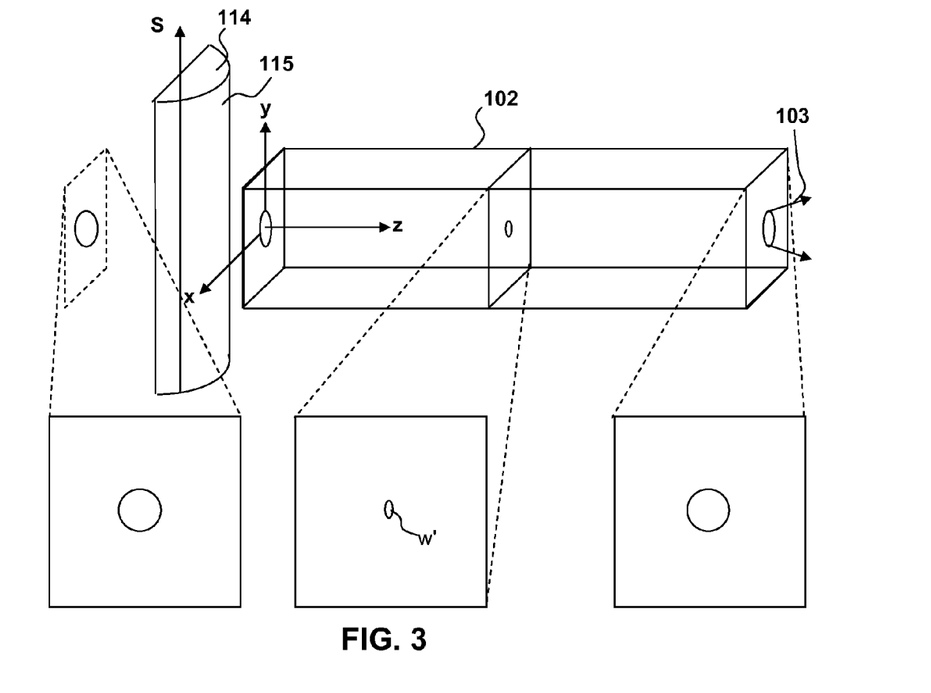
FIG. 3 is a three-dimensional schematic diagram illustrating use of a cylindrical lens to compensate for walk-off in a nonlinear wavelength conversion crystal according to an embodiment of the present invention.

As can be seen from FIG. 3, a cylindrical lens 114 can be used to reshape an input beam 101 in one direction without introducing astigmatism in the resulting output beam. The cylindrical lens 114 can be placed between the spherical relay lenses 110, 112 and the nonlinear crystal 102. Alternatively, the crystal 102 may be placed between the cylindrical lens 114 and the spherical relay lenses to obtain the same desired effect. The cylindrical lens 114 is generally characterized by a curved cylindrical refracting surface 115. The refracting surface 115 is generally symmetric with respect to a cylindrical symmetry axis S. The curvature of the refracting surface 115 determines the roundness of the beam that exits the crystal 102. The cylindrical shape of the lens 114 provides the lens with focusing properties that tend to diverge or converge light in a direction perpendicular to the symmetry axis S without converging or diverging light in directions parallel to the symmetry axis.

The analysis of the problem begins by imaging the input beam 101 into a waist location inside the non-linear crystal 102 using a relay such as that shown in FIG. 2B. The input beam is typically focused to a round waist. As explained above, the non-linear crystal generates second harmonic beam 103 that walks off the input beam. The waist of the second harmonic beam is then elongated in the walk-off direction of the non-linear crystal. To compensate for this walk-off, lens 114 is introduced as shown in FIG. 3. In the example of FIG. 3, lens 114 compresses the input beam in the walk-off direction, to generate a waist w' that is elliptical, having its minor axis parallel to the walk-off direction (in this case, along the x-axis) and its major axis along a non-walk-off direction that is orthogonal to the beam propagation direction and to the walk-off direction. In FIG. 3, the beam propagates along the z-axis, and the non-walk-off direction is along the y-axis. When lens 114 is chosen correctly, the ellipticity of the input beam waist w' will just compensate for the walk-off of the second harmonic beam, and as a result, the second harmonic beam 103 is round.

By way of example, and not by way of limitation, if the cylindrical lens 114 is to compress or expand the beam along the x-axis, the symmetry axis S of the lens can be aligned parallel to the y-axis of the crystal. Suppose that, initially, the input beam 101 has a round cross-section before entering the cylindrical lens 114 as seen in the leftmost inset in FIG. 3. The cylindrical lens 114 converges the input beam 101 and compresses it to an elliptical waist w' approximately in the middle of the crystal 102, as seen in the middle inset in FIG. 3. Due to the compression of the input beam waist along the x-axis by the cylindrical lens 114 and the walk-off of the second harmonic beam along the x-axis due to the anisotropy of the refractive index of the crystal 102, the second harmonic beam emerges from the crystal with a round cross-section, as seen in the rightmost inset in FIG. 3.

Figure 4A:
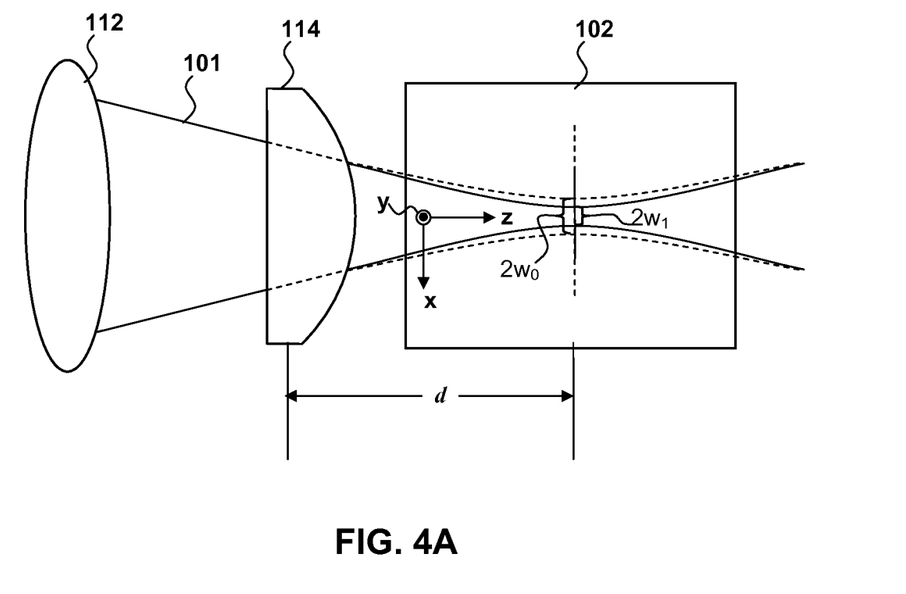
FIGS. 4A-4D are schematic diagrams of a wavelength conversion apparatus according to different versions of an embodiment of the present invention.
Figure 5A:
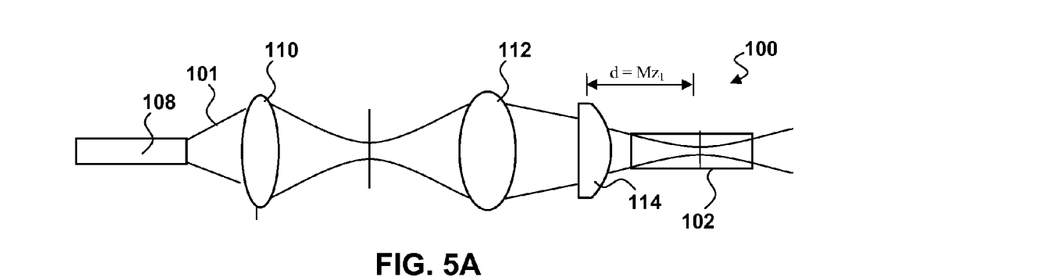
FIG. 5A is a schematic diagram of a wavelength conversion apparatus according to another embodiment of the present invention.

The invention is further illustrated in FIG. 4A and FIG. 5A, where it is desirable to reshape the beam waist $w_0$ to the desired shape of the virtual beam waist $w_1$ by compressing the beam waist along the walk-off direction (the x-direction in this example). It is also desired to place the virtual beam waist $w_1$ at approximately the same location as the original beam waist $w_0$ would have been in the absence of the lens 114 so that there is approximately zero astigmatism.

Based on ray optics one would conclude that it would be impossible to use a single cylindrical lens to reshape the input beam in the manner illustrated in FIG. 4A and FIG. 5A. Imagine putting the cylindrical lens a distance d in front of the beam waist $w_0$ produced by relay lenses 110 and 112. It is desired to create a new beam waist $w_1$ with magnification $M_x$ in the walk-off direction compared to the original beam waist $w_0$. Furthermore, the image of the original beam waist $w_0$ (i.e., the new beam waist $w_1$) should be at the same location as the original beam waist $w_0$. The original beam waist $w_0$ may therefore be regarded as a virtual object and the new beam waist $w_1$ may be regarded as the image of that object. Based on ray optics, one would have:

object distance=$-d$ image distance=$+d$

Note the minus sign for the object distance. The minus sign is present because the cylindrical lens is placed in the beam before the virtual object is brought to a focus. According to classical ray optics, the magnification $M_x$ is given by:

$$M_x = \frac{\text{image\_distance}}{\text{object\_distance}} = \frac{d}{-d} = -1.$$

So there would appear to be no way to get the desired magnification and the desired image location using classical ray optics with a single lens.

However, if one uses the Gaussian optics equations for focusing, it turns out to be possible to find a cylindrical lens that works. For reference, the Gaussian optics equations are:

$$(d_2 - f) = \frac{f^2}{z_0^2 + (d_1 - f)^2}(d_1 - f) \quad \text{(i)}$$

and $$w_1^2 = \frac{f^2}{z_0^2 + (d_1 - f)^2}w_0^2, \quad \text{(ii)}$$

where f is the focal length of the lens, $d_1$ is the object distance, $d_2$ is the image distance, $w_0$ is original the beam waist at the object, $w_1$ is the final beam waist at the image, and $z_0$ is the initial Rayleigh range given by $z_0 = \pi w_0^2/\lambda$, where $\lambda$ is the wavelength of the light being imaged.

The cylindrical lens is placed a distance d in front of the (virtual) waist $w_0$, so the object distance $d_1$ is equal to $-d$. The original waist w is then imaged at distance $+d$ in front of the lens. Now, the distance d and the focal length f need to be determined to get the desired magnification $M_x$. (The magnification is defined as the ratio of the final waist size to the size the waist would have had without the lens: $M = w_1/w_0$.) Using the formulas for Gaussian imaging, the distance d can be expressed as:

$$d = M z_0 \quad \text{(iii)}$$

where $z_0$ is the Rayleigh range for the original beam waist given by: $z_0 = \pi w_0^2/\lambda$. As is generally understood in the field of optics and particularly in the field of laser science, the Rayleigh length or Rayleigh range is the distance along the propagation direction of a beam from the waist to the place where the area of the cross section is doubled.

Using equation (i) and equation (ii) one can calculate that the right focal length to use is:

$$f = \frac{1 + M^2}{1 - M^2} z_0 M \quad \text{(iv)}$$

For example, if the wavelength $\lambda$ is 1.06 μm and an initial spot size of $w_0 = 120$ μm and it is desired to cut the spot size in half, then $z_1 = 42.7$ mm and $M = \frac{1}{2}$. From equations (iii) and (iv) above, one calculates $d = 21.3$ mm and $f = 35.5$ mm. It is noted that the positive value of the focal length f implies that the cylindrical lens 114 would be a converging lens in this case. It is further noted that if the magnification is less than 1, the distance d will be less than one Rayleigh length.

For the sake simplicity, this example does not take into account the effect of the refractive index of the nonlinear crystal. However, the simplified calculation provides a good estimate and the effect of the refraction in the crystal can be taken into account by adjustment of the distance d. The distance d is in fact an effective distance. As is well known, a light beam takes longer to come to a focus when it travels through a medium of refractive index greater than 1. Therefore, the effective distance is given by:

Effective distance=physical distance travelled through air+(physical distance travelled through crystal)/n where n is the refractive index of the non-linear crystal. For example, for LBO, the index n is approximately 1.6. Using the above equation, the physical distance from the waist location to lens 114 can be computed, once the effective distance d is calculated from Eq. (iii).

In general, when the cylindrical lens compresses the beam waist $w_0$ along the walk-off direction, the distance d of the lens 114 to the beam waist $w_1$ is selected such that d is less than the Rayleigh range for the original beam waist $w_0$ and greater than the Rayleigh range for the new beam waist $w_1$. In other words, when the cylindrical lens compresses the beam waist $w_0$ along the walk-off direction:

$$d < \frac{\pi w_0^2}{\lambda} \text{ and } d > \frac{\pi w_1^2}{\lambda}.$$

The walk-off of the second harmonic beam due to anisotropy of the refractive index in the nonlinear crystal 102 (or distortion due to refraction at a Brewster-cut end face) can be estimated to determine the amount of magnification M needed to re-shape the input beam. The amount of walk-off is dependent on the optical properties of the nonlinear optical crystal. In particular, the walk-off depends on the degree of anisotropy of the refractive index in the crystal with respect to direction of propagation and the length of the crystal.

There are a number of different types of optical crystals with well-known optical properties including refractive index anisotropy and walk-off angles. These properties are available, for example, from the computer program SNLO referenced earlier. Once the walk-off angle of non-linear crystal 102 is known, the degree of walk-off can be calculated from well-known optical principles or may be determined by experiment.

The nonlinear optical crystal 102 may be phase matched or quasi-phase matched for a particular nonlinear optical process, such as SHG. In some embodiments, the system 100 may include two or more nonlinear optical crystals, e.g., an SHG crystal coupled to a THG crystal. In such cases, it may be necessary to take into account walk-off in both crystals. In addition, of one of the crystals has a Brewster-cut face, one may take the effect of the Brewster face into account in determining the amount of walk-off compensation required of the lens 114.

In the approximation that input beam 101 is undepleted by the frequency conversion in the non-linear crystal or crystals, formulas in the article by Boyd and Kleinman, Journal of Applied Physics 39 (1968) pp. 3597-3639 (referenced above) can be used to calculate the magnification M needed to make the final output beam round.

For a more exact approach one can simulate nonlinear optical frequency conversion in the presence of walkoff, diffraction, and pump depletion using a modified version of the well-known numerical technique called "split-step beam propagation method (BPM)". The numerical simulation can include arbitrary nonlinear interactions between up to three distinct optical fields (fundamental, second harmonic, and third harmonic wavelengths.) The nonlinear crystals can be simulated using a series of 2-dimensional slices, each of which was represented as a grid of sampled optical fields.

Nonlinear optical interactions can be applied to complex (i.e., including phase) scalar fields on a "grid-point by grid-point" basis in the real-space domain, using the "slowly varying envelope approximation" difference equations (valid for pulse durations >10 femtoseconds). Then, using the Fourier-optics (2-dimensional FFT) method for beam propagation within the paraxial approximation (valid for beams larger than ~10 wavelengths across), the optical fields at the next slice within the nonlinear crystal can be calculated. Walkoff can be simulated by applying a linear phase gradient to the extra-ordinarily polarized field prior to each beam-propagation step, and then removing the linear phase gradient prior to each nonlinear-optical step.

Therefore, all relevant linear (diffraction, refraction, birefringence-induced spatial walkoff) and nonlinear (power flow between wavelengths and induced phase shifts) optical effects can be accounted for. In cases involving multiple nonlinear crystals, (e.g., SHG and THG crystals), each crystal can be treated separately. Specifically, the output field from the SHG crystal can be propagated via linear-BPM through free-space and lenses (if required by the design) before entering the THG crystal.

Once the amount of walk-off compensation is determined, either by experiment or calculation, the cylindrical lens 114 can be configured to compensate for this amount of walk-off. The cylindrical lens should be configured to provide the desired magnification M and to place the new beam waist $w_1$ at the same location as the original beam waist $w_0$, as shown for example in FIG. 4A.

There are in general two important beam parameters needed to determine the pre-compensation needed. The first parameter is the degree of roundness desired in the output beam that exits the crystal 102. In general, the roundness of a beam may be expressed as the ratio of the width along the minor axis to the width along the major axis. Typically, it is desired that the roundness be between about 0.85 and 1, or in other words, between 85% and 100%. Note that since the minor axis of an ellipse is by definition shorter than the major axis, the roundness is by definition less than or equal to 100%.

The second beam parameter is astigmatism. If a beam has astigmatism, the beam radius focuses to minimum values $w_{1x}$, $w_{1y}$ in the x and y directions at different locations along the z-axis, referred to as $z_{1x}$ and $z_{1y}$. The astigmatism may be quantified in terms of the positions $z_{1x}$ and $z_{1y}$ and the Rayleigh ranges $RR_x$ and $RR_y$ in the x and y directions, respectively. Specifically, the Astigmatism A, may be expressed as:

$$A = \frac{|z_{1x} - z_{1y}|}{\frac{1}{2}(RR_x + RR_y)}, \text{ where } RR_x = \frac{\pi w_{1x}^2}{\lambda} \text{ and } RR_y = \frac{\pi w_{1y}^2}{\lambda}.$$

where $\lambda$ is the wavelength of the beam. Since the cylindrical lens 114 does not have a focusing effect in a direction parallel to the cylindrical symmetry axis S, the astigmatism of second harmonic beam 103 can be adjusted by making small changes to the position of the cylindrical lens with respect to the z-axis. Thus, astigmatism may be reduced to approximately zero. As used herein approximately zero astigmatism means an astigmatism between zero and 20%.

Figure 4B:
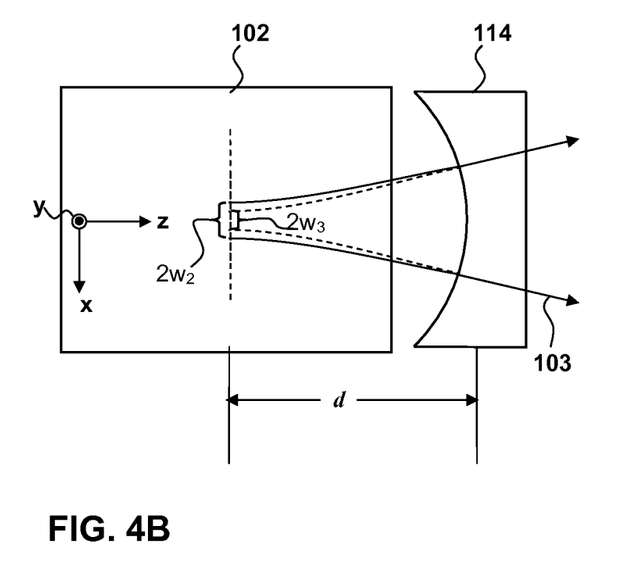

Several variations of the embodiment shown in FIG. 4A and FIG. 5A are possible. For example, cylindrical lens 114 may be placed after the non-linear crystal 102, as shown in FIG. 4B. In this case, relay lenses 110 and 112 bring the input beam to a focus within non-linear crystal 102, and the second harmonic beam 103 that is thereby generated has a waist size of $w_2$ in the walk-off direction (along the x-axis in FIG. 4B). To make the second harmonic beam round, waist size $w_2$ is compressed so that it has the same value as the waist of second harmonic beam 103 along the non-walk-off direction. To accomplish this, lens 114 is a diverging lens that creates a new beam waist $w_3$ that is a virtual beam waist at the same location as the original beam waist $w_2$.

Figure 4C:
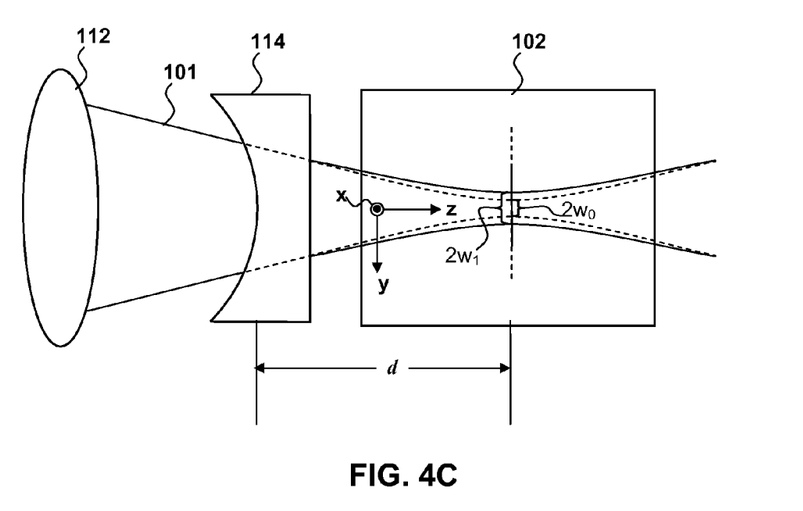

In another embodiment, walk-off is compensated by expanding the input beam waist in the non-walk-off direction. This embodiment is shown in FIG. 4C, where the walk-off in the x-direction is compensated by expanding the beam in the y-direction using a diverging lens 114 located be fore the crystal 102. By way of numerical example suppose that the initial value of the beam waist radius is 60 μm, and it is desired to expand it to 120 μm. Then $z_0$=10.7 mm and M=2. Then using Equation (i) and (ii), d=21.4 mm and f=−35.7 mm. It is noted that the negative value of the focal length f implies that the cylindrical lens in this case would be a diverging lens in such a case.

In general, when the cylindrical lens expands the beam waist $w_0$ along the non-walk-off direction, the distance d of the lens 114 to the beam waist $w_1$ is selected such that d is greater than the Rayleigh range for the original beam waist $w_0$ and less than the Rayleigh range for the new beam waist $w_1$. In other words, when the cylindrical lens expands the beam waist $w_o$ along the non-walk-off direction:

$$d > \frac{\pi w_0^2}{\lambda} \text{ and } d < \frac{\pi w_1^2}{\lambda}.$$

Figure 4D:
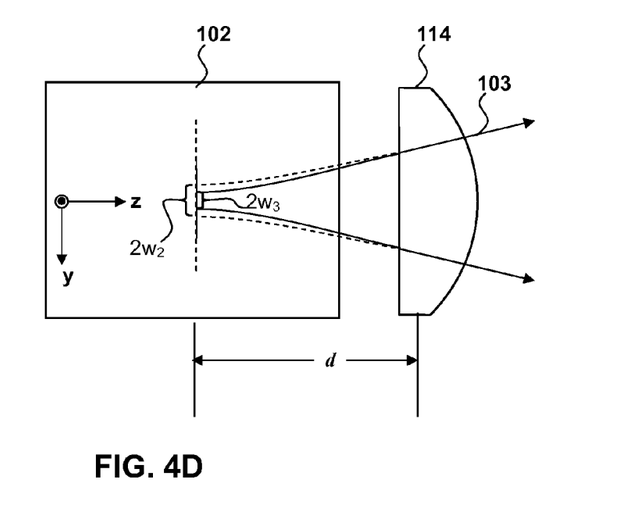

A fourth embodiment of the invention is shown in FIG. 4D, where, as in FIG. 4B, cylindrical lens 114 is placed after non-linear crystal 102. In the case of FIG. 4D, however, cylindrical lens 114 affects the non-walk-off direction. Input beam 101 generates second harmonic beam 103 having waist size $w_3$ in the non-walk-off direction. Cylindrical lens 114 expands the waist of beam 103 in the non-walk-off direction to the size $w_2$ of the waist in the walk-off direction.

In the embodiments of FIGS. 4A and 4C, input beam 101 is re-imaged by cylindrical lens 114 to a new waist that has a different size but the same location as the original waist that input beam 101 would have in the absence of cylindrical lens 114. As a result, in the embodiments of FIGS. 4A and 4C, second harmonic beam 103 also has the same waist location as it would have in the absence of cylindrical lens 114. In the embodiments of FIGS. 4B and 4D, the second harmonic beam is re-imaged directly by cylindrical lens 114 so that the second harmonic beam has the same waist location as it would have in the absence of cylindrical lens 114. Therefore, in all of the embodiments of FIGS. 4A-4D, after cylindrical lens 114 is inserted, second harmonic beam 103 has a new waist at the same location as its original waist.

Therefore, based on Gaussian optics and in accordance with embodiments of the invention, it is possible to obtain desired beam radius and image location in a nonlinear crystal by placing a single cylindrical lens located before or after a non-linear crystal in order compensate for walk-off in the nonlinear optical crystal. Such embodiments provide for control over the shape of the output beam without introducing astigmatism.

Figure 5B:
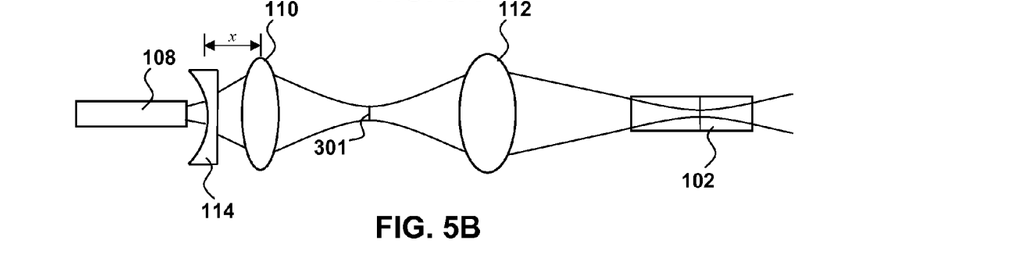
FIG. 5B is a schematic diagram of a wavelength conversion apparatus according to an alternative embodiment of the present invention.

Another possibility, depicted in FIG. 5B, is to put the cylindrical lens 114 a distance x before the collimating lens that collimates the light out of the fiber 108. The new lens would create a virtual waist at the same location as the old waist (i.e., at the collimating lens) but with a different waist size. For a desired magnification M, one obtains, similar to equation (iii), $$x = M z_1$$

The focal length is given by an equation like Equation (iv) except with a minus sign:

$$f = -\frac{1+M^2}{1-M^2} z_1 M$$

In this case, the minus sign indicates that the cylindrical lens 114 is a diverging lens. This option would also work, if the location of the cylindrical lens is not restricted by hardware constraints.

Similarly, cylindrical lens 114 may be placed near any waist of input beam 101, such as waist 301 depicted in FIG. 5B. Equation analogous to Eqs. (iii) and (iv) can be used to achieve the same results described above; namely, a high quality output beam.

Furthermore, cylindrical lens 114 can be replaced by a cylindrical mirror, or any uni-axial focusing element that performs the same function as a cylindrical lens.

2. Two-Lens Relay Between SHG and THG Crystals

Figure 6:
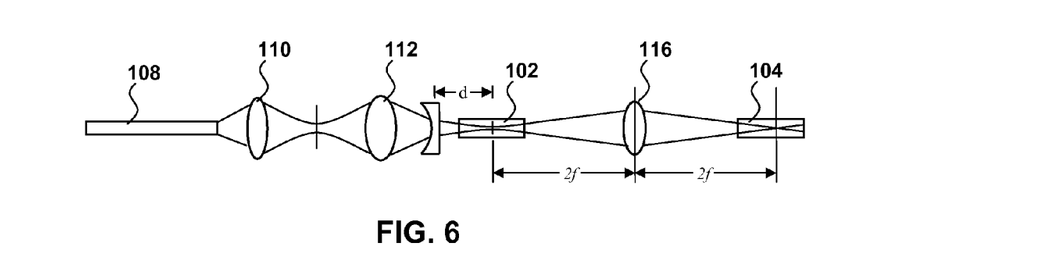
FIG. 6 is a schematic diagram of a wavelength conversion apparatus having nonlinear crystals for second harmonic generation (SHG) and third harmonic generation (THG) according to an alternative embodiment of the present invention.
Figure 7:
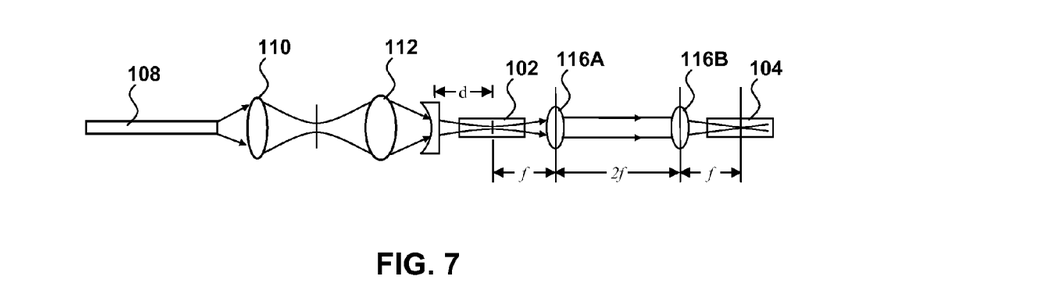
FIG. 7 is a schematic diagram of a wavelength conversion apparatus having nonlinear crystals SHG and THG according to another alternative embodiment of the present invention.

FIG. 6 and FIG. 7 illustrate examples of embodiments of the invention implemented in optical wavelength conversion systems that utilize a first nonlinear crystal for SHG and a second nonlinear crystal for THG. In such embodiments, one can use the near Brewster face on the THG crystal, but this has the effect that even more pre-compensation is required.

As seen in both FIG. 6 and FIG. 7, input light from an optical fiber 108 can be coupled to a SHG crystal 102. Optical output 103 from the SHG crystal is coupled to the THG crystal 104. It is noted that the output 103 of the SHG crystal 102 includes second harmonic radiation having a frequency twice that of the input radiation 101.

According to alternative embodiments of the invention, the beam waist produced in the SHG crystal 102 by the relay lenses 110, 112 and cylindrical lens 114 can be re-imaged 1:1 to the THG crystal 104 using one or more spherical lenses. According to one alternative embodiment illustrated in FIG. 6, the waist of the beam spot inside the SHG crystal 102 can be 1:1 imaged into the THG crystal 103 with a single lens 116 placed halfway between the SHG crystal and the THG crystal. However, if only one lens is used to do this, astigmatism is introduced into the beam at the THG crystal. As is generally understood, in Gaussian optics different spot sizes focus in different places. This produces an astigmatism. To reduce this astigmatism to an acceptable level, it may be necessary for the single lens 116 to have a rather long focal length, e.g., 170 mm or greater (e.g., 250 mm). Unfortunately, for imaging the beam spot inside the SHG 102 crystal 1:1 to the THG crystal 104, classical ray optics dictates that the distance from the lens to each crystal must be twice the focal length of the lens f. For a 170 mm focal length lens this means that the total distance between the crystals 102, 104 would be 4 f or about 680 mm, which is a relatively large distance. Furthermore, due to chromatic aberrations in a typical lens SHG output from the SHG crystal 102 and the input radiation from the input beam 101 focus at different points. In the case of infrared (e.g., 1.06 micron) input radiation 101 and green (e.g., 532 nm) SHG the input and SHG radiation can be focused 20 to 30 mm apart. This may be an impractically large distance, e.g., if the THG crystal 104 is only 20 mm long. Consequently, third harmonic generation is not efficient since there will be relatively poor spatial overlap between the SHG output beam and the input IR beam.

A better way to relay the light from the SHG crystal to the THG crystal is to use two identical lenses 116A, 116B of focal length f in a co-axial tandem configuration, e.g., as depicted in FIG. 7. As used herein, the term "co-axial tandem configuration" means that the centers of the two lenses are aligned along a common optical path. The optical path between the two lenses may be straight, as shown in FIG. 7. Alternatively, the optical path may be bent, e.g., where the path reflects off a mirror or is refracted by a prism.

The distance (or more correctly, the effective distance) from the center of the SHG crystal 102 to the first lens 116A is f; the distance between the lenses is 2 f and the distance from the second lens 116B to the center of the THG crystal 104 is f. Thus, the total distance between the two crystals is again 4 f. However, if two lenses are used, the focal length f can be chosen to be whatever value is convenient.

Working Example

In a working example, an infrared light beam was coupled to a 15-mm long LBO SHG crystal, which was optically coupled to a Brewster-cut LBO THG crystal that was 20 mm long. A single cylindrical lens was used to create an elliptical IR spot in the SHG crystal of radii 60 μm×120 μm. This combination produced an approximately round UV beam, for IR peak powers in quite a large range, from 15 kW (and possibly less) to 75 kW. The cylindrical lens was a diverging lens in the configuration of FIG. 4C. The cylindrical lens had a focal length of approximately −34 mm, and was placed approximately 15 mm in front of the entrance face of the SHG crystal. The 60 μm×120 μm waist created in the input beam compensated for walk-off in both the SHG and THG crystals, as well as for a Brewster cut on the exit face of the THG crystal.

In the working example two relay lenses were used to couple light from the SHG crystal to the THG crystal. Each lens had a focal length f of about 70 mm; consequently, the distance between the crystals was about 280 mm, less than half of the single lens relay. The advantages to using two lenses are that (1) there is no astigmatism introduced, and (2) there is significantly less chromatic aberration than with a single lens. In general, the use of smaller focal length lenses result in smaller chromatic aberration. For the fused silica lenses used in this example (f=70 mm) the green and IR waists were less than 3 mm apart—a significant improvement compared to what would be expected for a single 170-mm focal length lens.

In other embodiments, lenses 116A and 116B have different focal lengths $f_1$ and $f_2$, respectively. In these embodiments, the effective distance between the waist of second harmonic beam 103 in non-linear crystal 102 and lens 116A is $f_1$; the distance between lens 116A and 116B is $f_1+f_2$; and the effective distance between lens 116B and the waist of the second harmonic beam in crystal 104 is $f_2$. Such a relay minimizes astigmatism and chromatic aberration, as above, and furthermore provides for an imaging ratio of $f_2/f_1$ from the SHG crystal to the THG crystal, rather than simply the 1:1 imaging discussed above.

Embodiments of the present invention include wavelength converted laser systems that include wavelength conversion systems of the type described above.

Figure 8:
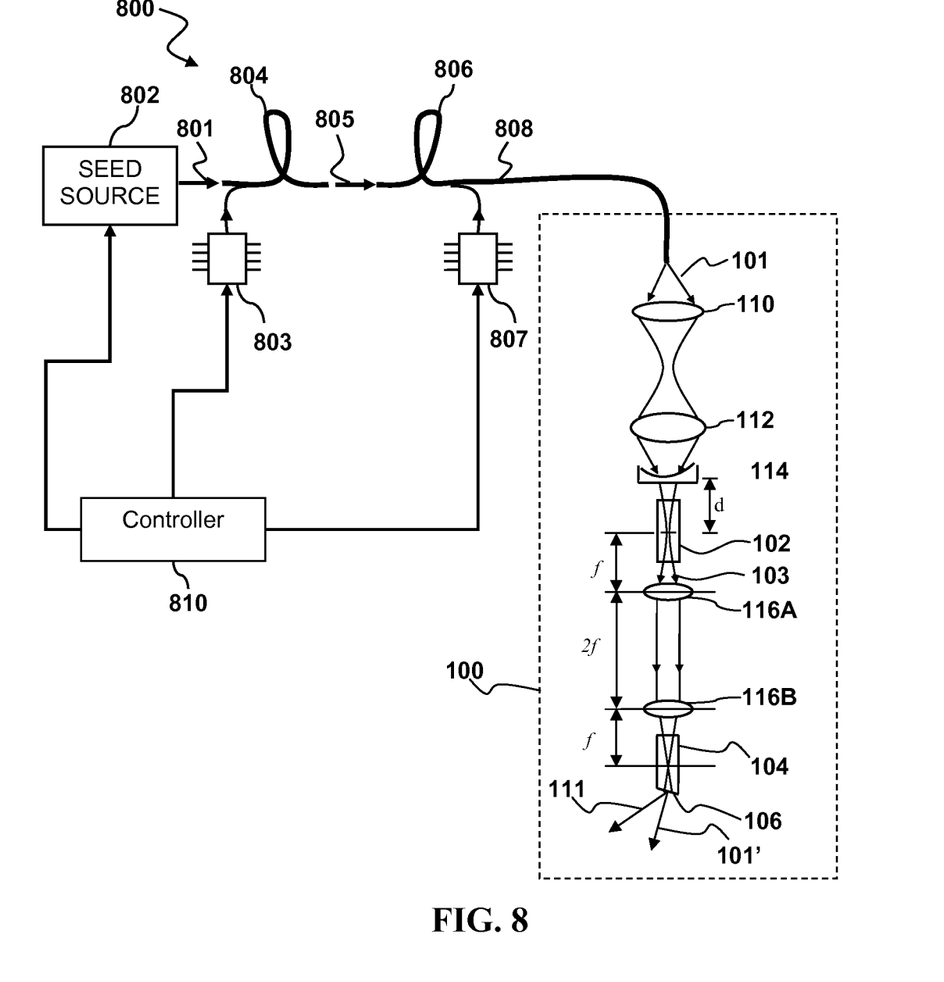
FIG. 8 is a schematic diagram of a wavelength converted laser system according to an embodiment of the present invention.

FIG. 8 depicts an example of a wavelength-converted laser system 800 according to an embodiment of the present invention. Specifically, the system 800 generally includes a seed source 802, one or more optical amplifiers 804, 806, and a wavelength converter 100, which may be configured as described herein with respect to FIGS. 4A-4D, FIG. 5A, FIG. 5B, FIG. 6, or FIG. 7. The seed source 802 generates seed radiation 801, which is amplified by the optical amplifiers 804, 806 to produce an amplified output that serves as input radiation 101 for the wavelength converter. The wavelength converter 100 wavelength converts at least a portion of the amplified output to produce a wavelength converted output 111. A portion 101' of the input 101 may also emerge from the wavelength converter 100.

There are a number of different possible designs for the seed source 802. For example, the seed source 802 may be a diode laser pumped by driving electric current through the diode. Various types of laser diodes, such as a distributed Bragg reflector (DBR) laser, distributed feedback (DFB), or Fabry-Perot laser diode may be used. An example of a commercially available DBR is a model DBR-1064-100 from Sacher Lasertechnik Group of Marburg, Germany. Alternatively, the seed source 802 may be a diode-pumped solid state (DPSS) laser, which may be passively Q-switched, mode-locked or run continuous wave (CW) or quasi-CW. Other types of lasers may alternatively be used as the seed source 802.

The optical amplifiers may include one or more amplifier units 804, 806. For example, an optional pre-amplifier 804 can be optically coupled in series between the seed source 802 and a power amplifier 806. The pre-amplifier 804 may amplify the seed radiation 802 thereby producing an intermediate signal 805, which is amplified by the power amplifier 806 to produce the amplified output that forms the input beam 101. The amplifiers 804, 806 are optically coupled to an output fiber 808. The input beam 101 emerges from an end face of the fiber 808.

By way of example, one or more of the amplifiers 804, 806 may be fiber amplifiers that include optical fibers coupled to pumping sources 803, 807. The optical fibers may generally include a cladding and a doped core. The core of the fiber may be, e.g., about 6 microns in diameter. The fiber may be a polarization maintaining or single polarization fiber. A portion of one of the amplifiers 806 may form the output fiber 808. Input radiation that is to be amplified (e.g., seed radiation 801 or intermediate radiation 805) is coupled to the core. Pumping radiation from the pumping sources 803, 807 (e.g., diode lasers) is also typically coupled to the core, but may alternatively be coupled to the cladding. Dopant atoms, e.g., rare earth elements such as ytterbium (Yb), erbium (Er), neodymium (Nd), holmium (Ho) samarium (Sm) and thulium (Tm), or combinations of two or more of these, in the core of the fiber absorb energy from the pumping radiation. The absorbed energy amplifies the energy of the input radiation in the core of the fiber. The input radiation stimulates emission of radiation from the dopant atoms. The stimulated radiation has the same frequency and phase as the input radiation. The result is an amplified output having the same frequency and phase as the input radiation but a greater optical intensity.

A controller 810 may be operably coupled to the seed source 102 and/or pump sources 803, 807. The controller 810 may implement hardware or software logic adapted to control the power of the seed radiation 801 or pump radiation provided by the pump sources 803, 807. By controlling the power of the seed radiation 801 from the seed source and/or the pump radiation from the pump sources 803 and 807, the controller 810 controls the optical power of the input beam 101 provided to the wavelength converter 100.

The wavelength converter 100 may include first and second non-linear optical crystals 102, 104, relay lenses 110, 112 and a cylindrical lens 114, which may be configured as described above. In particular the first non-linear crystal 102 may be a SHG crystal that produces a SHG output 103 from a non-linear interaction between the crystal and the input radiation 101. The cylindrical lens 114 may be placed a distance d from the SHG crystal 102. The cylindrical lens may be configured to image a circular input beam 101 to an elliptical beam waist within the SHG crystal 102 to at least partially compensate for walk-off due to anisotropy in the refractive index of the SHG crystal. Spherical lenses 116A, 116B may be configured to couple the SHG output 103 to a THG crystal 104 along with an unconverted portion of the input radiation 101. The THG crystal produces third harmonic radiation through a sum-frequency interaction between the SHG output 103 and the unconverted input radiation. The third harmonic radiation emerges from the THG crystal as the wavelength converted output 111. Some leftover input radiation 101' may also emerge from the THG crystal 104. The THG crystal may include a Brewster-cut end face 106 that separates the wavelength converted output 111 from the leftover input radiation 101'. By appropriately adjusting the focal length and position of the cylindrical lens 114 it is possible to produce a beam of wavelength-converted output 111 having a desired cross-sectional shape.

Embodiments of the present invention allow for simple adjustment of beam shape using a single cylindrical lens and the principles of Gaussian optics. The lens can be placed close to a nonlinear crystal thereby overcoming pre-existing space constraints in certain optical systems without having to re-design major hardware components.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A nonlinear optical system comprising:
    a non-linear optical crystal configured to generate an output beam from a non-linear optical interaction with an input beam;
    optics configured to image the input beam to an original input beam waist within the non-linear optical crystal, whereby the output beam has an original output beam waist; and
    a uni-axial focusing element optically coupled to the non-linear optical crystal, wherein the uni-axial focusing element is configured so that the output beam has a new output beam waist at approximately the same location as the original output beam waist.

2. The system of claim 1, wherein the uni-axial focusing element is a cylindrical lens.

3. The system of claim 1, wherein the uni-axial focusing element is configured to compress the input beam waist along a walk-off direction of the non-linear optical crystal while not compressing the input beam waist along a non-walk-off direction of the non-linear optical crystal.

4. The system of claim 1, wherein the uni-axial focusing element is configured to expand the input beam waist along a non-walk-off direction of the non-linear optical crystal, while not expanding the input beam waist along a walk-off direction of the non-linear optical crystal.

5. The system of claim 1, wherein the uni-axial focusing element is configured to compress the output beam waist along a walk-off direction of the non-linear optical crystal while not compressing the output beam waist along a non-walk-off direction of the non-linear optical crystal.

6. The system of claim 1, wherein the uni-axial focusing element is configured to expand the output beam waist along a non-walk-off direction of the non-linear optical crystal while not expanding the output beam waist along a non-walk-off direction of the non-linear optical crystal.

7. The system of claim 1 wherein a roundness of the output beam is greater than or equal to 85%.

8. The system of claim 1 wherein an astigmatism of the output beam is less than or equal to 20%.

9. The system of claim 1 wherein the non-linear optical crystal is a second harmonic generation crystal and wherein the output beam is a second harmonic output beam.

10. The system of claim 9, further comprising a third harmonic generation crystal positioned to generate a third harmonic beam from a non-linear optical interaction with the input beam and with the second harmonic output beam.

11. The system of claim 10, further comprising first and second spherical lenses disposed in a co-axial tandem configuration between the second harmonic generation crystal and the third harmonic generation crystal; wherein the first and second spherical lenses have focal lengths $f_1$ and $f_2$ respectively; wherein the first and second spherical lenses are separated from each other by a distance $f_1+f_2$; and wherein an effective distance between the first lens and the new output beam waist of the second harmonic output beam is $f_1$.

12. The system of claim 11, wherein the focal lengths $f_1$ and $f_2$ and material of the first and second spherical lenses are chosen such that the second harmonic output beam and the input beam are focused to beam waists in the third harmonic generation crystal that are less than three millimeters apart.

13. The system of claim 9 wherein the third harmonic beam has a roundness of greater than or equal to 85% and an astigmatism of less than or equal to 20%.

14. The system of claim 9 wherein the third harmonic generation crystal includes a Brewster cut end face.

15. A wavelength-converted laser system comprising:
    a laser system configured to emit a laser beam;
    a first non-linear optical crystal;
    optics configured to focus the laser beam to an original waist within the first non-linear optical crystal; and
    a uni-axial focusing element configured to image the original waist to a new waist at approximately the same location as the original waist.

16. The system of claim 15 wherein the shape of the new waist is an ellipse, and wherein the minor axis of the ellipse is parallel to a walk-off direction of the non-linear optical crystal.

17. The system of claim 15 wherein the uni-axial focusing element is configured such that the first non-linear optical crystal generates an output beam that has a roundness of greater than or equal to 85% and an astigmatism of less than or equal to 20%.

18. The system of claim 15 wherein the laser system comprises a seed source and a fiber amplifier optically coupled to the seed source.

19. The system of claim 15 further comprising a second non-linear optical crystal optically coupled to the first non-linear optical crystal, and wherein the uni-axial focusing element is configured such that the second non-linear optical crystal generates an output beam that has a roundness of greater than or equal to 85% and an astigmatism of less than or equal to 20%.

20. The system of claim 19, further comprising first and second spherical lenses disposed in a co-axial tandem configuration between the first and second non-linear optical crystals, wherein the first and second spherical lenses have focal lengths $f_1$ and $f_2$ respectively, wherein a distance between the first and second spherical lenses is $f_1+f_2$, and wherein an effective distance between the first lens and the new waist of the laser beam is $f_1$.

21. A wavelength-converted laser system comprising:
    a laser system configured to emit a laser beam;
    a non-linear optical crystal configured to generate an output beam from a non-linear interaction optical interaction with the laser beam;
    optics configured to image the laser beam to a laser beam waist within the non-linear optical crystal, whereby the output beam has an original output beam waist that is elongated along a walk-off direction of the non-linear crystal; and
    a uni-axial focusing element optically coupled to the non-linear optical crystal, wherein the uni-axial focusing element is configured to image the original output beam waist to a new output beam waist at approximately the same location as the original output beam waist.

22. The system of claim 21, wherein the uni-axial focusing element is configured so that the new output beam waist has a roundness of greater than or equal to 85%.

* * * * *